United States Patent Office 3,134,713
Patented May 26, 1964

---

3,134,713
VINYL PHOSPHATE PESTICIDE
Everett E. Gilbert, Morris Township, Morris County, Julian A. Otto, Lake Tamarack, and Edmund J. Rumanowski, Jersey City, N.J., assignors to Allied Chemical Corporation, New York, N.Y., a corporation of New York
No Drawing. Filed Apr. 2, 1962, Ser. No. 184,504
5 Claims. (Cl. 167—30)

This invention relates to the production of 1-(2,5-dichlorophenyl)-2,2-dichlorovinyl diethyl phosphate, a new vinyl phosphate compound useful as an active pesticidal toxicant.

Accordingly, one object of the invention is to provide a new vinyl phosphate compound in the form of 1-(2,5-dichlorophenyl)-2,2-dichlorovinyl diethyl phosphate. Another object of the invention is to provide a process for producing the new vinyl phosphate compound. A further object is to employ the new vinyl phosphate compound for application as a pesticide. Other objects and advantages of the invention will be apparent hereinafter.

1-(2,5-dichlorophenyl)-2,2-dichlorovinyl diethyl phosphate, the vinyl phosphate compound of this invention, may be represented by the following formula:

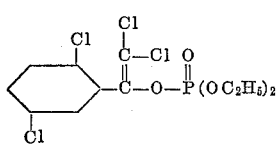

The vinyl phosphate compound of the invention may be prepared by reacting trichloroacetyl-2,5-dichlorobenzene with triethyl phosphite. This reaction may be represented by the following equation:

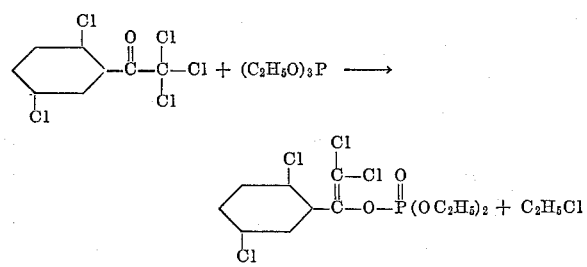

J. Indian Chem. Soc. 26, 287 (1949), shows that trichloroacetyl-3,4-dichlorobenzene can be made in nearly theoretical yield from trichloroacetyl chloride and 1,2-dichlorobenzene (o-dichlorobenzene) in the presence of aluminum chloride. However, in attempting to prepare the presently required reactant, i.e. trichloroacetyl-2,5-dichlorobenzene from trichloroacetyl chloride and 1,4-dichlorobenzene (p-dichlorobenzene), it is reported that "No reaction occurs between p-dichlorobenzene and trichloroacetyl chloride even after refluxing in petroleum ether solution for 12 hours, unchanged p-dichlorobenzene being recovered."

We have now discovered that the trichloroacetyl-2,5-dichlorobenzene reactant may be prepared by chlorinating acetyl-2,5-dichlorobenzene at temperature in the range of about 120° to 240° C. for at least about 5 hours, preferably in the presence of ultraviolet light. At least about 3 mols of chlorine per mol of acetyl-2,5-dichlorobenzene are employed. Upon vacuum distillation of the resulting reaction mass, the desired trichloroacetyl-2,5-dichlorobenzene is obtained in excellent yield, generally at least about 90% of theory. The reaction may be represented by the following equation:

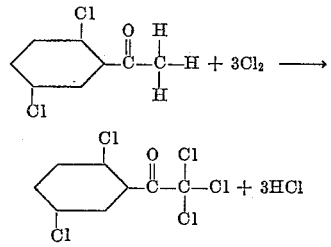

It is preferred to prepare the trichloroacetyl-2,5-dichlorobenzene reactant by chlorinating acetyl-2,5-dichlorobenzene at temperature in the range of about 120° to 210° C. for about 7 to 10 hours. Although longer reaction times are suitable, no advantage is realized by use of reaction times in excess of 15 hours. Further, the reaction is preferably conducted in the presence of ultraviolet light in order to speed up the reaction. The vacuum distillation is preferably carried out at temperature below about 200° C.

Generally speaking, the vinyl phosphate compound is prepared by adding triethyl phosphite dropwise to the trichloroacetyl-2,5-dichlorobenzene with stirring and cooling to maintain the reaction temperature at about 30° to 60° C. After addition of the phosphite, the reaction mixture is then held for about 2 to 5 hours at temperature of about 30° to 95° C.

Although the trichloroacetyl-2,5-dichlorobenzene and triethyl phosphite may be charged in molar proportions of one mol of trichloroacetyl-2,5-dichlorobenzene to about 1 to 1.5 mols triethyl phosphite, approximately equimolar proportions of the reactants are preferred.

If desired, the reaction may be carried out in the presence of an inert organic solvent, preferably one lower boiling than the vinyl phosphate compound. Suitable organic solvents include benzene, acetone, toluene, ethanol and methanol. When the reaction is completed, lower boiling solvents so used may be recovered for reuse by simple distillation at atmospheric or lower pressure.

The reaction may be carried out at any temperature up to the decomposition point of the reactants but is preferably carried out at about 30° to 95° C. Generally, the reaction is quite vigorous during addition of the reactants, and cooling is desirable to retard the reaction. As is apparent from the above equation illustrating the reaction, ethyl chloride is formed as by-product. This by-product may be readily removed from the reaction mass by simple distillation procedure.

The vinyl phosphate compound of the present invention is insoluble in water but soluble in acetone, alcohol, propylene glycol, corn oil, kerosene, xylene, etc.

The following example is given for the purpose of illustrating preparation of the vinyl phosphate of this invention. In the example parts are by weight:

EXAMPLE

*A. Preparation of Trichloroacetyl-2,5-Dichlorobenzene*

208 parts of acetyl-2,5-dichlorobenzene were charged into a reaction vessel equipped with a gassing tube, a stirrer and a condenser with hydrogen chloride trap. Chlorine gas was introduced in the presence of ultraviolet light over a period of 10 hours at temperature ranging from 120° to 210° C. 322 parts of a liquid comprising crude trichloroacetyl-2,5-dichlorobenzene were obtained. The crude liquid was vacuum distilled at temperature of 128–130° C./1 mm. Hg to produce as overhead 289 parts of relatively pure trichloroacetyl-2,5-dichlorobenzene. This represented a yield of about 90% of theory.

B. Preparation of 1-(2,5-Dichlorophenyl)-2-2-Dichlorovinyl Diethyl Phosphate 44 parts of trichloroacetyl-2,5-dichlorobenzene were placed in a reaction vessel provided with a stirrer and a water bath. 27.5 parts of triethyl phosphite were added dropwise with stirring and cooling to maintain the reaction mixture at temperature of 40° C.±5° C. The bath was removed, and the reaction temperature rose to 55° C. and then slowly dropped. The reaction mixture was held at room temperature for about 5 hours, and the ethyl chloride formed during the reaction, as well as excess triethyl phosphite, was stripped off. Finally, the reaction mixture was distilled at 1 mm. Hg pressure to final temperature of 150° C. 60.6 parts of an oil comprising 1-(2,5-dichlorophenyl)-2,2-dichlorovinyl diethyl phosphate was obtained as residue. This amount of vinyl phosphate compound constituted about 97.5% of theory.

The vinyl phosphate compound possessed the following properties:

Distilled at 173–177° C./2.5 mm. Hg
Percent chlorine found—35.7 (theory, 36.0)
Percent phosphorus found—7.7 (theory, 7.9)

Infrared spectrographic analysis showed the presence of ethoxy groups, the phosphate group, the benzene ring and vinyl unsaturation.

Hydrolysis with concentrated HCl yielded a product identified as dichloromethyl 2,5-dichlorophenylketone by comparing it with a known sample by infrared spectrographic analysis.

As indicated above, the vinyl phosphate compound of this invention finds valuable application as a pesticidal toxicant, being extremely effective against insects and mites. For example, this compound when applied to the skin of cattle has been found to repell or kill stable flies. Moreover, the compound is outstandingly toxic to mites. The compound is ordinarily applied as a pesticidal toxicant in conjunction with a carrier which may be a solid, liquid or gaseous material. The vinyl phosphate compound may be employed either in the form of aqueous sprays or dust compositions, and the amount of toxicant used may vary, sufficient quantity being utilized to provide the required toxicity.

When employed in the form of a powder or dust for killing insects or mites, the toxicant may be mixed with a substantial proportion of any suitable inert material or diluent, preferably in finely divided form, such as known grades of prepared pesticide carrier clays, such as pyrophyllite, fuller's earth, bentonite, sulfur, lime, talc, whiting, diatomaceous earth, etc. Suitable dusts of this type usually contain not less than 0.5% and preferably not more than 10% by weight of the toxicant.

Liquid pesticide sprays containing the toxicant may be prepared by first forming a solution of the compound in a suitable organic solvent, e.g. xylene, methylated naphthalenes or any highly aromatic petroleum type pesticide oil, and preferably adding a small amount of wetting or emulsifying agent commercially employed in the art such as diglycol oleate or p-isooctyl phenyl ether of polytheylene glycol. The resulting concentrate solution is incorporated with water in quantity sufficient to form an aqueous spray dispersion or emulsion having the desired active ingredient concentration.

In a preferred embodiment, aqueous spray dispersions or suspensions may be formed by incorporating in water dry mixture or so-called dry wettable spray powders or water-disphersible pastes containing the toxicant. These mixtures may also include inert diluents, suitable quantities of wetting and dispersing agents and, if desired, secondary toxicants.

The aqueous spray dispersions of the invention preferably should contain the active ingredient in an amount not less than 1/32 of a pound per 100 gallons of spray. The more usual concentrations being in the range of 1/16 to 1/2 of a pound per 100 gallons of spray.

Following Table 1 shows the results of tests relating to the application to insects and mites of the vinyl phosphate compound of this invention.

TABLE 1

| Formulation | Percent Kill | | | | |
| --- | --- | --- | --- | --- | --- |
| | Mites | Pea Aphids | Mexican Bean Beetle Larvae | Southern Armyworms | Houseflies |
| 1 part vinyl phosphate composition:[1] 9 parts acetone; 10 parts water | 100 | 100 | 100 | 100 | |
| 0.1% vinyl phosphate compound in Karo syrup (a commercial corn syrup) | | | | | 97.5 |

[1] 4.8 grams of vinyl phosphate compound dissolved in acetone to 100 cc

The test on toxicity to mites was carried out on two-spotted mites (*Tetranychus telarius*) by spraying the indicated formulation onto horticultural (cranberry) bean plants infested with the mites. Following treatment, the plants were stored on racks in irrigated trays under greenhouse conditions. Mortality counts were made three days after treatment.

The test on toxicity to pea aphids (*Macrosiphum pisi*) was run by removing the pea aphids from infested broad bean plants, placing them on a wire screen and spraying with the indicated formulation. Following treatment, the pea aphids were confined to untreated broad bean plants. Record of kill was made three days after treatment.

The test on toxicity to Mexican bean beetle larvae (*Epilachna varivestis*) was run by spraying horticultural (cranberry) bean plants with the indicated formulation and allowing the plants to dry. The larvae were confined to the treated foliage by means of wire cages. Record of kill was made three days after treatment.

The test on toxicity to southern armyworms (*Prodenis eridania*) was carried out by spraying horticultural (cranberry) bean plants with the indicated formulation and allowing the plants to dry. Armyworm larvae were confined to the treated foliage by means of wire cages. Mortality count was made four days after treatment.

The test on toxicity to houseflies (*Musca domestica*) was carried out by spraying the indicated formulation onto glass plates and allowing them to dry. The flies were confined over the plates by means of screen wire hemispheres. After one hour exposure to the bait, moisture and food were provided in the form of balls of "Cellucotton" (an absorbent cellulose composition resembling cotton) soaked in water-sugar solution. Percent kill was recorded 24 hours after confinement.

Following Table 2 illustrates comparative miticide activity of the vinyl phosphate compound of this invention and the most closely related prior art vinyl phosphate compound, 2-chloro-1(2,5-dichlorophenyl)vinyl diethyl phosphate, an insecticide disclosed and claimed in U.S.P. 3,003,916 of October 10, 1961.

TABLE 2

| Toxicant | Formulation | Mites, Percent Kill |
| --- | --- | --- |
| 1-(2,5-Dichlorophenyl)-2,2-dichlorovinyl diethyl phosphate. | 1 part vinyl phosphate composition [1] per 319 parts of water. | 97.5 |
| Do | 1 part vinyl phosphate composition [1] per 639 parts of water. | 89.7 |
| 2-Choror-1-(2-5-dichlorophenyl)vinyl diethyl phosphate. | 1 part vinyl phosphate composition [1] per 319 parts of water. | 58.9 |
| Do | 1 part vinyl phosphate composition [1] per 639 parts of water. | 5.6 |

[1] 4.8 grams of vinyl phosphate compound dissolved in acetone to 100 cc.

The tests on toxicity to mites were carried out as described above in connection with Table 1.

As shown by the above data, the vinyl phosphate compound of the present invention shows unexpectedly increased miticidal activity as compared to the most closely related prior art vinyl phosphate compound.

Since various changes and modifications may be made in the invention without departing from the spirit thereof, the invention is to be taken as limited only by the scope of the appended claims.

We claim:

1. The vinyl phosphate compound having the following formula:

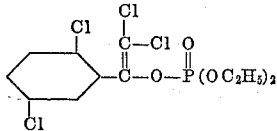

2. A process for preparing the vinyl phosphate compound having the following formula:

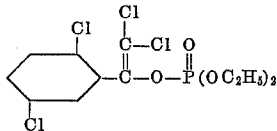

which comprises reacting trichloroacetyl-2,5-dichlorobenzene and triethyl phosphite, the trichloroacetyl-2,5-dichlorobenzene being prepared by chlorinating acetyl-2,5-dichlorobenzene with at least about 3 mols of chlorine per mole of acetyl-2,5-dichlorobenzene at temperature in the range of about 120° to 240° C. for at least about 5 hours and recovering the trichloroacetyl-2,5-dichlorobenzene from the resulting reaction mass by vacuum distillation.

3. The process of claim 2 wherein the acetyl-2,5-dichlorobenzene is chlorinated at temperature in the range of about 140° to 210° C. for about 7 to 10 hours.

4. A pesticide composition containing as active toxicant ingredient the vinyl phosphate compound having the following formula:

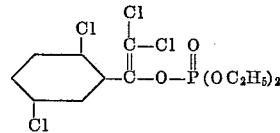

together with a carrier therefor.

5. A method of combatting pests which comprises subjecting said pests to the action of the vinyl phosphate compound having the following formula:

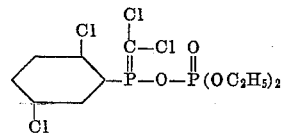

References Cited in the file of this patent

UNITED STATES PATENTS 3,003,916    Gilbert et al. _____ Oct. 10, 1961

UNITED STATES PATENT OFFICE
CERTIFICATE OF CORRECTION

Patent No. 3,134,713                 May 26, 1964

Everett E. Gilbert et al.

It is hereby certified that error appears in the above numbered patent requiring correction and that the said Letters Patent should read as corrected below.

Column 3, lines 59 and 60, for "polytheylene" read -- polyethylene --; line 67, for "water-disphersible" read -- water-dispersible --; column 4, line 39, for "Prodenis", in italics, read -- Prodenia --, in italics; line 57, for "2-chloro-1(2,5-" read -- 2-chloro-1-(2,5- --; same column, TABLE 2, first column, line 5 thereof, for "2-Choror-" read -- 2-Chloro- --; column 6, line 1, for "mole" read -- mol --; lines 23 to 28, the formula should appear as shown below instead of as in the patent:

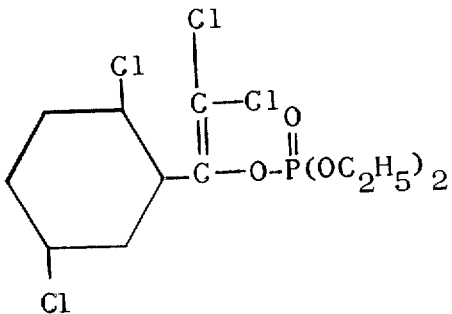

Signed and sealed this 6th day of October 1964.

(SEAL)
Attest:

ERNEST W. SWIDER                EDWARD J. BRENNER
Attesting Officer              Commissioner of Patents